(12) United States Patent
Liang et al.

(10) Patent No.: US 12,462,403 B2
(45) Date of Patent: Nov. 4, 2025

(54) METHOD FOR ESTIMATING AN EGO MOTION OF A VEHICLE ON THE BASIS OF MEASUREMENTS OF A LIDAR SENSOR AND COMPUTING DEVICE

(71) Applicant: Bayerische Motoren Werke Aktiengesellschaft, Munich (DE)

(72) Inventors: Yuran Liang, Munich (DE); Daniel Schwendner, Pfaffenhofen a.d.Ilm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 421 days.

(21) Appl. No.: 18/017,308

(22) PCT Filed: Jul. 19, 2021

(86) PCT No.: PCT/EP2021/070094
§ 371 (c)(1),
(2) Date: Jan. 20, 2023

(87) PCT Pub. No.: WO2022/018007
PCT Pub. Date: Jan. 27, 2022

(65) Prior Publication Data
US 2023/0342954 A1 Oct. 26, 2023

(30) Foreign Application Priority Data

Jul. 23, 2020 (DE) .................... 10 2020 119 498.6

(51) Int. Cl.
*G06T 7/246* (2017.01)
(52) U.S. Cl.
CPC .... *G06T 7/251* (2017.01); *G06T 2207/10028* (2013.01); *G06T 2207/30248* (2013.01)
(58) Field of Classification Search
CPC ........... G06T 7/251; G06T 2207/10028; G06T 2207/30248
See application file for complete search history.

(56) References Cited

U.S. PATENT DOCUMENTS

| 8,886,387 B1 * | 11/2014 | Agarwal | ............... | G06V 20/56 |
| | | | | 701/28 |
| 8,989,944 B1 * | 3/2015 | Agarwal | ............... | G01S 15/86 |
| | | | | 340/576 |

(Continued)

FOREIGN PATENT DOCUMENTS

| DE | 102 52 323 A1 | 5/2004 |
| DE | 10 2008 026 397 A1 | 1/2009 |

(Continued)

OTHER PUBLICATIONS

Yokoyama et al., "Detection and Classification of Pole-like Objects from Mobile Laser Scanning Data of Urban Environments" (pp. 1-9). (Year: 2013).*

(Continued)

*Primary Examiner* — Manav Seth
(74) *Attorney, Agent, or Firm* — Crowell & Moring LLP

(57) ABSTRACT

A method estimates an ego motion of a vehicle. The method includes the steps of: determining a first point cloud having a plurality of first points on the basis of sensor data which are provided by a lidar sensor of the vehicle at a first point in time; determining a second point cloud having a plurality of second points on the basis of sensor data which are provided by the lidar sensor at a second point in time following the first point in time; associating the first points to clusters and the second points to clusters; selecting first points from the first point cloud and selecting second points from the second point cloud; determining a displacement between respective corresponding selected first points; and selected second points and estimating the ego motion of the vehicle on the basis of the displacement, wherein the selection of the first points and the selection of the second points are carried out according to a shape of the cluster.

10 Claims, 4 Drawing Sheets

(56) References Cited

U.S. PATENT DOCUMENTS

| | | | |
|---|---|---|---|
| 11,900,626 B2* | 2/2024 | Tang | G06T 7/337 |
| 12,094,153 B2* | 9/2024 | Niigaki | G06T 7/11 |
| 2010/0017128 A1 | 1/2010 | Zeng | |
| 2014/0022248 A1* | 1/2014 | Kuffner, Jr. | G06T 17/20 345/420 |
| 2018/0341019 A1* | 11/2018 | Sakai | G01S 7/003 |
| 2018/0341263 A1 | 11/2018 | Rust | |
| 2020/0174131 A1* | 6/2020 | Chen | G01S 17/931 |
| 2020/0256999 A1* | 8/2020 | Yellepeddi | G01S 17/89 |
| 2021/0056713 A1* | 2/2021 | Rangesh | G01S 17/89 |
| 2021/0199799 A1* | 7/2021 | Taalimi | G06N 7/01 |
| 2023/0059883 A1* | 2/2023 | Hu | G01S 7/4802 |

FOREIGN PATENT DOCUMENTS

| | | | |
|---|---|---|---|
| DE | 10 2018 112 115 A1 | 11/2018 | |
| GB | 2532948 A * | 6/2016 | G06K 9/00201 |

OTHER PUBLICATIONS

Larsson et al., "Ego motion Tracking with Lidar point clouds" (pp. 1-92) (Year: 2019).*

Miyasaka et al., "Ego-Motion Estimation and Moving Object Tracking using Multi-layer LIDAR" (pp. 151-156). (Year: 2009).*

International Search Report (PCT/ISA/210) issued in PCT Application No. PCT/EP2021/070094 dated Nov. 3, 2021 with English translation (five (5) pages).

German-language Written Opinion (PCT/ISA/237) issued in PCT Application No. PCT/EP2021/070094 dated Nov. 3, 2021 (five (5) pages).

German-language Search Report issued in German Application No. 10 2020 119 498.6 dated Jun. 17, 2021 with partial English translation (13 pages).

Hernández et al., "Intelligent feature selection method for accurate laser-based mapping and localisation in self-driving cars," $10^{th}$ Workshop on Planning, Preception and Navigation for Intelligent Vehicles PPNIV'18—2018 IEEE/RSJ International conference on Intelligent Robots and Systems, pp. 1-6 (six (6) pages).

* cited by examiner

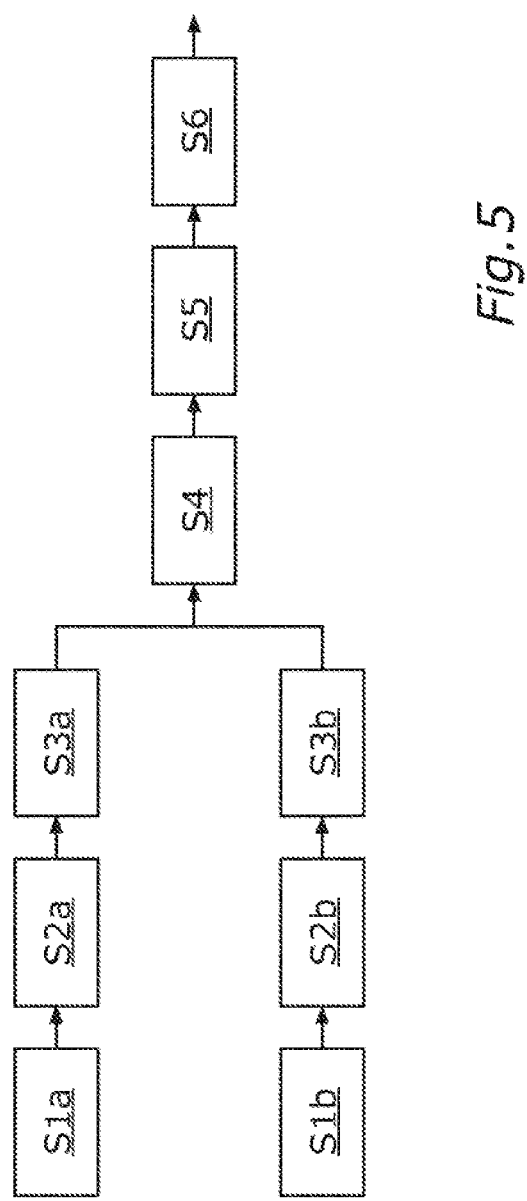

METHOD FOR ESTIMATING AN EGO MOTION OF A VEHICLE ON THE BASIS OF MEASUREMENTS OF A LIDAR SENSOR AND COMPUTING DEVICE

BACKGROUND AND SUMMARY

The present invention relates to a method for estimating an ego motion of a vehicle. Moreover, the present invention relates to a computing device for a vehicle. Finally, the present invention relates to a computer program and a computer-readable memory (medium).

The determination of the ego motion of a vehicle is of decisive importance for driver assistance systems or automated or autonomous driving. Up to this point, inertial measurement units (IMU) have been used to determine the ego motion. This technology can be susceptible to errors, however, and does not offer sufficient accuracy. In addition, it is known from the prior art that the ego motion of the vehicle is ascertained with the aid of a satellite-based position determination system. Such position determination systems can often not be available in urban areas, tunnels, or the like, however.

Furthermore, it is known from the prior art that the ego motion of a vehicle is determined on the basis of sensor data of a lidar sensor. For this purpose, DE 10 2008 026 397 A1 describes a system for estimating the vehicle dynamic, which comprises the vehicle position and the vehicle speed, on the basis of a stationary object. The system comprises an object sensor, for example a lidar sensor, which supplies object signals of the stationary object. The system furthermore comprises vehicle-side sensors which supply signals that represent the vehicle movement. The system additionally comprises an assignment processor, which receives object signals and provides the object tracking by way of multiple data frames. The system additionally comprises a longitudinal status estimation processor, which receives the object signals and the sensor signals and supplies a correction of the vehicle speed in the forward direction. The system additionally comprises a transverse status estimation processor, which receives the object signals and the sensor signals and supplies a correction of the vehicle speed in the transverse direction.

It is additionally known from the field of robotics that the ego motion is estimated on the basis of sensor data of a lidar sensor using the iterative closest point method. Objects can be acquired for this purpose using the lidar sensor and point clouds can be determined which describe these objects. These point clouds can be determined for successive measurements or points in time. Moreover, the points of the respective point clouds can be clustered or compiled. In robotics, the determination of the ego motion is typically carried out in interior spaces. Objects having known geometries and/or defined contours are typically available here. It is thus usually ensured that the number of the points of the point clouds does not change, since the contour of the objects is always identical.

In this context, filter methods are also used to select points from the point clouds which are used for the determination of the ego motion. In one known filter method, the so-called "outlier" method, the clusters formed are checked for an absolute number of points and point density. If the absolute number of points and/or the point density is excessively low, the cluster is considered to be an outlier and filtered out or not taken into consideration.

In road traffic, a large number of dynamic or moving objects are usually present, which are not suitable for determining the ego motion of the vehicle. In addition, interfering objects are typically present there, for example, guide rails, which do not have defined boundaries or contours in the acquisition range of the lidar sensor. These interfering objects are not recognized as such using the known filter methods, however. The reason for this is that these objects have a high point density and therefore do not fall under the known filter criterion.

It is the object of the present invention to disclose a solution for how the ego motion of a vehicle can be determined more reliably on the basis of measurements using a lidar sensor.

This object is achieved according to the invention by a method, by a computing device, by a computer program, and by a computer-readable memory (medium) having the features of the independent claims. Advantageous refinements of the present invention are specified in the dependent claims.

A method according to the invention is used for estimating an ego motion of a vehicle. The method comprises determining a first point cloud having a plurality of first points on the basis of sensor data, which are provided by a lidar sensor of the vehicle at a first point in time. Moreover, the method comprises determining a second point cloud having a plurality of second points on the basis of sensor data which are provided by the lidar sensor at a second point in time following the first point in time. In addition, the method comprises assigning the first points to clusters and the second points to clusters and selecting first points from the first point cloud and selecting second points from the second point cloud. Moreover, the method comprises determining a displacement between respective corresponding selected first points and selected second points and estimating the ego motion of the vehicle on the basis of the displacement. It is provided here that the selection of the first points and the selection of the second points are carried out in dependence on a shape of the respective clusters.

The ego motion of the vehicle is to be determined or estimated with the aid of the method. The ego motion can describe the speed and/or travel direction of the vehicle. The method can be carried out using a computing device of the vehicle, for example, using an electronic control unit of the vehicle. This computing device can progressively receive sensor signals from the lidar sensor of the vehicle. Chronologically successive measurements or measurement cycles can be carried out by the lidar sensor. In the respective measurements, light signals can be emitted by the lidar sensor and the light signals reflected in an environment of the vehicle and in particular on objects can be received again. On the basis of the time-of-flight between the emission of the respective light signal and the reception of a light signal reflected by the object, the distance between the lidar sensor and the object can then be determined with the knowledge of the propagation speed of the light signal. During a measurement cycle using the lidar sensor, light signals can be emitted into different spatial areas of the environment and received again.

In a measurement cycle of the lidar sensor, a point cloud can then be determined on the basis of the received or reflected light signals. This point cloud can be two-dimensional or three-dimensional. This point cloud describes the environment of the vehicle. In the present case, at least one first point cloud, which is determined at the first point in time or in a first measurement cycle, and a second point cloud, which is determined at a second point in time or in a second measurement cycle, are observed. The second point in time follows the first point in time or the second measurement cycle follows the first measurement cycle in this case.

Furthermore, the first points of the first point cloud are clustered and the second points of the point cloud are clustered. In other words, the first points of the first point cloud can be classified into groups and the second points in the second point cloud can also be classified into groups. In the clustering, the attempt is made in particular to compile the points which originate from the same object. In addition, first points are selected from the first point cloud and second points are selected from the second point cloud. In other words, the first points and the second points are filtered. It is assumed here that the selected first points and the selected second points are assigned to a static object. The displacement can then be determined between respective corresponding selected first points and second points. This displacement can be determined, for example, with respect to the vehicle longitudinal direction and the vehicle transverse direction. The displacement can describe a translation and a rotation. The ego motion of the vehicle between the first point in time and the second point in time can then be determined from the displacement between the selected first and second points.

According to one essential aspect of the invention, it is provided that the selection of the first points and the selection of the second points are carried out in dependence on a shape or formation of the respective clusters. It can be estimated in particular on the basis of the shape of the respective clusters of the first and the second points whether the cluster originates from a static or a dynamic object. First and second points which originate from a dynamic object, for example, are not to be selected. Furthermore, it can be estimated on the basis of the shape of the clusters whether the object is suitable for the determination of the ego motion. If it is recognized on the basis of the shape, for example, that it is an extended object or an object in which the boundaries or contours cannot be unambiguously determined, it cannot be used to determine the ego motion of the vehicle. The goal is thus to filter out dynamic objects and interfering objects. Overall, the determination of the ego motion of the vehicle can thus be carried out more reliably on the basis of the measurements using the lidar sensor.

In one embodiment, it is provided that the displacement between the corresponding selected points is determined by means of an iterative closest point algorithm. Before carrying out the iterative closest point algorithm, the point clouds can initially be clustered and subsequently filtered. For this purpose, initially the first points from the first point cloud and the second points from the second point cloud can be selected. The corresponding point pairs in the first point cloud and the second point cloud can then be determined. This can be achieved in principle in that for a first point, the closest second point is found. In addition, a weighting of the points can be performed. The points can be weighted in dependence on their surroundings and thus features and regions of interest can be highlighted. Furthermore, points can be excluded or not taken into consideration. For example, points which are outliers or do not contribute to the convergence of the iterative closest point algorithm can be excluded. Finally, an error metric can then be determined and an optimization can be carried out.

In a further embodiment, the selection of the first points and the selection of the second points are additionally carried out in dependence on a location of the respective clusters. In addition to the shape of the clusters, the spatial location of the clusters in relation to the vehicle can also be taken into consideration. Moreover, it can be estimated on the basis of the spatial location of the clusters which object it can be. If this is taken into consideration, the ego motion can be determined on the basis of the measurements using the lidar sensor.

It is provided for this purpose in particular that for first points and for second points which are assigned to a roadway in an environment of the vehicle, the selection does not take place. When the ego motion of the vehicle is to be determined, the vehicle is usually located on a roadway. It can be determined or estimated where the roadway is located relative to the vehicle. It can thus also be ascertained whether a cluster can be assigned to the roadway. If a cluster is assigned to the roadway, it can be assumed with high probability that it is a further road user and thus a dynamic or moving object. The ego motion of the vehicle cannot be adequately determined on the basis of point clouds which describe a dynamic object. It is therefore provided that clusters of first points and clusters of second points which are arranged in an area of the roadway are not taken into consideration or are filtered out. Moreover, clusters can be recognized on the basis of the spatial location which are assigned to a boundary of the roadway, such as guide rails or the like. These boundaries extend in parallel to the travel direction of the roadway. These boundaries can thus also be more reliably recognized and filtered out.

In a further embodiment, the selection does not take place for first points and for second points which are assigned to a cluster having an elongate shape. The borders cannot be ascertained in the case of elongate or spatially extended objects. Such elongate clusters result, for example, at roadway boundaries, such as guide rails, tunnel walls, or the like. In an elongate cluster, the points can be arranged essentially along a line. An elongate shape is understood in the present case in particular as a shape in which the length is significantly greater than the width. These elongate clusters typically have an extension in the travel direction or along the vehicle longitudinal axis. Different areas of these elongate objects can each be acquired in the successive measurements. Therefore, the respective point clouds also do not describe the same part of the object. Elongate objects can be viewed as interfering objects with respect to the determination of the ego motion of the vehicle. Such interfering objects or clusters which describe such interfering objects are therefore not taken into consideration or are filtered out.

Furthermore, elongate clusters can describe measurements of further road users and in particular further vehicles. When further vehicles are located in front of the ego vehicle in the travel direction, the rear areas are typically acquired by the further vehicles. The points which describe these rear areas also form elongate clusters which extend transversely to the travel direction or along the vehicle transverse axis. These clusters, which are assigned to dynamic objects, can also not be taken into consideration or filtered out in the estimation of the ego motion of the vehicle.

Furthermore, it is advantageous if a density-based spatial cluster analysis with noise is used to determine the clusters. In the clustering, the points of the respective point cloud are to be recognized which describe the same object. The density-based spatial cluster analysis with noise (density-based spatial clustering of applications with noise, DBSCAN) offers the advantage that an original number of clusters is not required, and points which are not part of the cluster can be identified.

According to a further embodiment, the clusters of the first point cloud and the clusters of the second point cloud are classified on the basis of a principal component analysis. In particular, the principal component analysis can be used to classify clusters as outliers. As already explained, elongate clusters or objects are not to be taken into consideration or are to be classified as outliers. A covariance matrix of the points of a cluster can be determined by means of the principal component analysis. Intrinsic values can then be determined on the basis of the covariance matrix, which describe the points of a cluster. If the ratio of the intrinsic values is small or falls below a predetermined limiting value, it can be assumed that it is an elongate object and thus an outlier. In this way, elongate objects can be recognized and filtered out reliably.

Furthermore, it is advantageous if corresponding clusters of the first points and clusters of the second points are determined, wherein the selection does not take place for first points and for second points if a size and/or shape of the corresponding clusters differs. In other words, it is provided that noisy objects or clusters which change the size and/or shape between the measurements are filtered out. It is thus to be checked whether the deviation of a cluster from the first measurement in relation to a cluster from the second measurement is excessively large. For this purpose, it can initially be determined which clusters of the first point cloud and which clusters of the second point cloud correspond. Furthermore, the intrinsic values of the corresponding clusters can be observed. In clusters or objects in which per dimension the ratio of the intrinsic values is greater than 5 or is less than ⅕, for example, it can be assumed that it is a noisy cluster. Such noisy clusters can be filtered out.

After the determination of the filtered point clouds, the first points of the first point cloud can be assigned to the second points of the point cloud. Closest neighbor searches can be used for this purpose. Experiments have shown here that so-called k-d trees are particularly suitable here due to the accuracy, computing time, and the memory requirement. Here, on the one hand, the corresponding points of the point clouds can be determined and, on the other hand, points can be sorted out or discarded. If, for example, the distance between points assigned to one another exceeds a predetermined value, these points can be sorted out. A transformation, which describes the translation and the rotation, can then be determined between the points assigned to one another and the ego motion of the vehicle can be derived therefrom. To additionally improve the computing effort and the accuracy, an initial transformation can be predetermined. This initial transformation can in particular be determined with the aid of an error state extended Kalman filter. The final transformation can be determined here in that the error between point clouds is minimized. A singular value decomposition can be used for this purpose in particular.

A computing device according to the invention for a vehicle is configured to carry out a method according to the invention. The computing device can be formed by an electronic control unit of the vehicle.

A sensor system according to the invention comprises a computing device according to the invention. Furthermore, the sensor system comprises at least one lidar sensor. This lidar sensor can be designed in particular as a so-called low-cost lidar sensor, which has a low resolution and/or a low frequency. The lidar sensor can be connected to the computing device for data transmission. Sensor data and/or the point clouds which are determined by the lidar sensor in the respective measurements can thus be transmitted to the computing device. The ego motion of the vehicle can then be estimated using the computing device. Moreover, the sensor system can have satellite-based position determination systems and/or inertial measurement units, which can additionally be used to determine the ego motion of the vehicle.

A vehicle according to the invention comprises a sensor system according to the invention and/or a computing device according to the invention. The vehicle is designed in particular as a passenger vehicle. The vehicle can also be designed as a utility vehicle.

A further aspect of the invention relates to a computer program, comprising commands which, upon the execution of the program by a computing device, prompt it to carry out a method according to the invention and the advantageous embodiments thereof. Furthermore, the invention relates to a computer-readable (memory) medium, comprising commands which, upon the execution by a computing device, prompt it to carry out a method according to the invention and the advantageous embodiments thereof.

The preferred embodiments presented with respect to the method according to the invention and the advantages thereof apply accordingly to the computing device according to the invention, to the sensor system according to the invention, to the vehicle according to the invention, to the computer program according to the invention, and to the computer-readable (memory) medium according to the invention.

Further features of the invention result from the claims, the figures, and the description of the figures. The features and combinations of features mentioned above in the description and the features and combinations of features mentioned hereinafter in the description of the figures and/or solely shown in the figures are usable not only in the particularly specified combination but also in other combinations or alone, without leaving the scope of the invention.

The invention will now be explained in more detail on the basis of preferred exemplary embodiments and with reference to the appended drawings.

BRIEF DESCRIPTION OF THE DRAWINGS

FIG. 5 is a schematic flow chart of a method for determining an ego motion of the vehicle.

In the figures, identical or functionally identical elements are provided with the same reference signs.

DETAILED DESCRIPTION OF THE DRAWINGS

Figure 1:
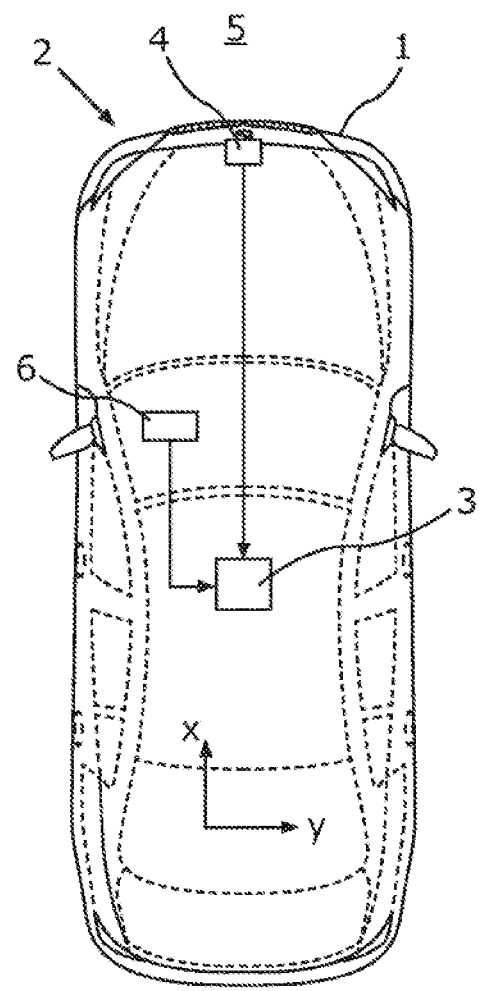
FIG. 1 is a schematic illustration of a vehicle, which has a sensor system having a lidar sensor.

FIG. 1 shows a schematic illustration of a vehicle 1, which is designed as a passenger vehicle, in a top view. The vehicle 1 has a vehicle longitudinal direction x and a vehicle transverse direction y. The vehicle 1 comprises a sensor system 2, which has a computing device 3. This computing device 3 can be formed, for example, by an electronic control unit of the vehicle 1. Furthermore, the sensor system 2 comprises a lidar sensor 4, using which an object in an environment 5 of the vehicle 1 can be acquired. In addition, the sensor system 2 comprises an inertial measurement unit 6.

Figure 2:
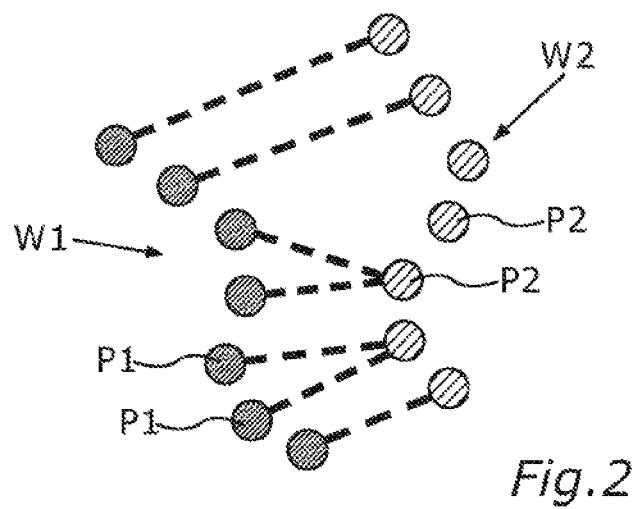
FIG. 2 is a schematic illustration of point clouds which are determined on the basis of measurements by the lidar sensor, wherein the measurements are recorded at different points in time.

FIG. 2 shows, in a very simplified illustration, a first point cloud W1, which comprises first points P1, and a second point cloud W2, which comprises second points P2. The first point cloud W1 is determined on the basis of a first measurement using the lidar sensor 4 and the second point cloud W2 is determined on the basis of a second measurement using the lidar sensor 4 in this case. The two point clouds W1, W2 each describe a static object in the environment 5 of the vehicle 1. The ego motion of the vehicle 1 can then be determined on the basis of an assignment of corresponding first points P1 and second points P2—as explained in more detail hereinafter. Furthermore, the ego motion of the vehicle 1 can additionally be determined on the basis of the data of the inertial measurement unit 6.

Figure 3:
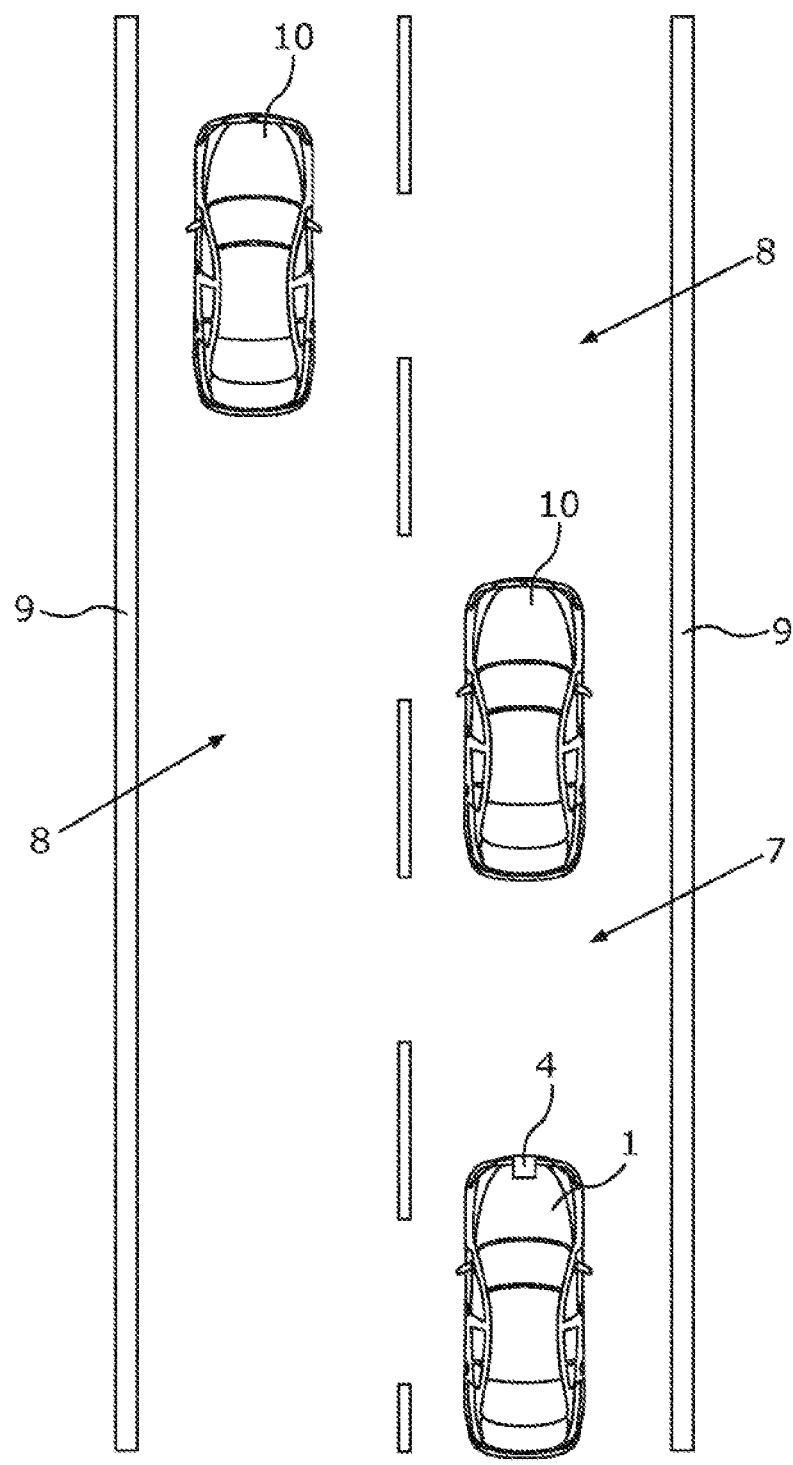
FIG. 3 is a schematic illustration of a traffic situation in which the vehicle is located on a roadway.

FIG. 3 shows a schematic illustration of a traffic situation in which the vehicle 1 is located on a roadway 7. The vehicle 1 moves here in the forward travel direction. The roadway 7 has two lanes 8 in the present case and is delimited by guide rails 9. Two further vehicles 10 are located as objects in the travel direction in front of the vehicle 1. The roadway 7 can be part of a freeway or highway.

Figure 4:
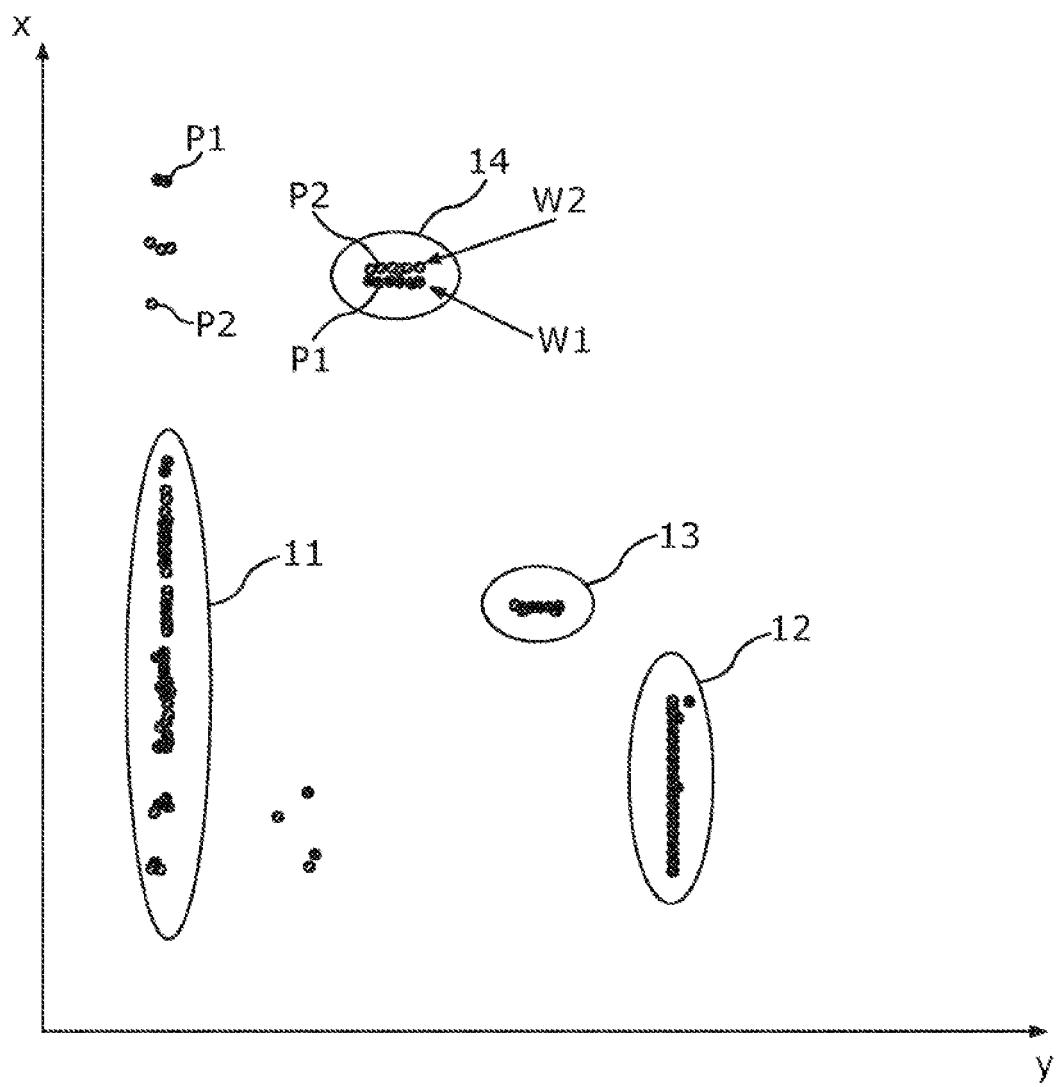
FIG. 4 is a schematic illustration of the acquired point clouds in the traffic situation according to FIG. 3.

FIG. 4 shows a schematic illustration of a first point cloud W1 and a second point cloud W2. The point clouds W1, W2 are plotted here with respect to a longitudinal axis x of the vehicle 1 and a transverse axis y of the vehicle 1. These point clouds W1, W2 describe the traffic situation according to FIG. 3. The first point cloud W1 was determined here on the basis of a first measurement using lidar sensor 4 of the vehicle 1 and the second point cloud W2 was determined on the basis of a second measurement using the lidar sensor 4. The first measurement was carried out here at a first point in time and the second measurement was carried out at a second point in time following the first point in time.

The areas 11 and 12 of the point clouds W1, W2 originate here from the guide rails 9. The points P1, P2, which originate from the guide rails 9, form elongate clusters which extend along the vehicle longitudinal direction x. At these points P1, P2, which originate from elongate objects or the guide rails 9, it is typically not the case that the points P1 and P2 describe the same areas of the object. Therefore, these elongate clusters of points P1, P2 in the areas 11 and 12 are not used for the estimation of the ego motion of the vehicle 1.

The areas 13 and 14 originate from the further vehicles 10. The further vehicles 10 are dynamic objects in the environment 5 of the vehicle 1, which are not suitable for determining the ego motion of the vehicle 1. Since these vehicles 10 are located in front of the vehicle 1 in the travel direction, the respective rear areas of the further vehicles 10 are acquired during the measurements using the lidar sensor 4. The points P1, P2, which describe the rear areas of the further vehicles 10, are also arranged in elongate clusters, wherein the clusters extend along the vehicle transverse direction y. The points P1, P2 which are located in the areas 13, 14 are also filtered out and not used for the estimation of the ego motion of the vehicle 1.

FIG. 5 shows a schematic flow chart of a method for determining the ego motion of the vehicle 1. In a step S1a, the first point cloud W1 is determined. The first points P1 of the first point cloud W1 are then clustered in a step S2a. In a step S3a, the filtering of the first points P1 then takes place. The clusters or the points P1, which describe dynamic objects and interfering objects, such as guide rails 9, can be filtered out in this case, as explained above in conjunction with FIG. 4. Similarly thereto, in a step S1b, the second point cloud W2 is determined, in a step S2b, the second points P2 of the second point cloud W2 are clustered, and in a step S3b, the second point cloud is filtered.

After the filtering, in a step S4, the corresponding clusters are determined. In a step S5, noisy clusters are ascertained and filtered out. Noisy clusters can be clusters which change the size and/or the shape between the measurements. In a step S6, the respective displacement between corresponding first points P1 and second points P2 is then determined. For this purpose, the iterative closest point method is used. A translation and a rotation can thus be determined between the corresponding points P1, P2 and the ego motion of the vehicle 1 can be derived therefrom.

Overall, an estimation of the ego motion of the vehicle can also be carried out on the basis of low-resolution lidar sensors 4 and inaccurate point clouds using the method. Furthermore, a higher level of robustness in the event of environmental influences and a low frequency of the lidar sensor can be achieved. The errors can be reduced by the filtering in the iterative closest point method.

The invention claimed is:

1. A method for estimating an ego motion of a vehicle, comprising:
   determining a first point cloud having a plurality of first points on the basis of sensor data, which are provided using a lidar sensor of the vehicle at a first point in time;
   determining a second point cloud having a plurality of second points on the basis of sensor data, which are provided using the lidar sensor at a second point in time following the first point in time;
   assigning the first points to clusters and the second points to clusters;
   selecting first points from the first point cloud and selecting second points from the second point cloud;
   determining a displacement between respective corresponding selected first points and selected second points; and
   estimating the ego motion of the vehicle on the basis of the displacement,
   wherein:
      the selection of the first points and the selection of the second points is carried out in dependence on a shape of the respective clusters; and
      the selection of the first points and the selection of the second points are additionally carried out in dependence on a location of the respective clusters.

2. The method according to claim 1, wherein
   the selection does not take place for first points and for second points which are assigned to a roadway in an environment of the vehicle.

3. A method for estimating an ego motion of a vehicle, comprising:
   determining a first point cloud having a plurality of first points on the basis of sensor data, which are provided using a lidar sensor of the vehicle at a first point in time;
   determining a second point cloud having a plurality of second points on the basis of sensor data, which are provided using the lidar sensor at a second point in time following the first point in time;
   assigning the first points to clusters and the second points to clusters;
   selecting first points from the first point cloud and selecting second points from the second point cloud;
   determining a displacement between respective corresponding selected first points and selected second points; and
   estimating the ego motion of the vehicle on the basis of the displacement,
   wherein:
      the selection of the first points and the selection of the second points is carried out in dependence on a shape of the respective clusters; and the selection does not take place for first points and for second points which are assigned to a cluster having an elongate shape.

4. The method according to claim 1, wherein a density-based spatial cluster analysis with noise is used for determining the clusters.

5. The method according to claim 1, wherein the clusters of the first point cloud and the clusters of the second point cloud are classified on the basis of a principal component analysis.

6. A method for estimating an ego motion of a vehicle, comprising:
   determining a first point cloud having a plurality of first points on the basis of sensor data, which are provided using a lidar sensor of the vehicle at a first point in time;
   determining a second point cloud having a plurality of second points on the basis of sensor data, which are provided using the lidar sensor at a second point in time following the first point in time;
   assigning the first points to clusters and the second points to clusters;
   selecting first points from the first point cloud and selecting second points from the second point cloud;
   determining a displacement between respective corresponding selected first points and selected second points; and
   estimating the ego motion of the vehicle on the basis of the displacement,
   wherein:
      the selection of the first points and the selection of the second points is carried out in dependence on a shape of the respective clusters;
      corresponding clusters of the first points and clusters of the second points are determined; and
      the selection does not take place for first points and for second points if a size and/or shape of the corresponding clusters differs.

7. A computing device for a vehicle, comprising:
   a processor and assorted memory configured to:
      determine a first point cloud having a plurality of first points on the basis of sensor data, which sensor data are provided using a lidar sensor of the vehicle at a first point in time;
      determine a second point cloud having a plurality of second points on the basis of sensor data, which sensor data are provided using the lidar sensor at a second point in time following the first point in time;
      assign the first points to clusters and the second points to clusters;
      select first points from the first point cloud and selecting second points from the second point cloud;
      determine a displacement between respective corresponding selected first points and selected second points; and
      estimate the ego motion of the vehicle on the basis of the displacement,
   wherein the selection of the first points and the selection of the second points is carried out in dependence on a shape of the respective clusters; and
   wherein the selection of the first points and the selection of the second points are additionally carried out in dependence on a location of the respective clusters.

8. A computer product comprising a non-transitory computer-readable medium having stored thereon program code that, when executed by a computing device, causes the acts of:
   determining a first point cloud having a plurality of first points on the basis of sensor data, which are provided using a lidar sensor of the vehicle at a first point in time;
   determining a second point cloud having a plurality of second points on the basis of sensor data, which are provided using the lidar sensor at a second point in time following the first point in time;
   assigning the first points to clusters and the second points to clusters;
   selecting first points from the first point cloud and selecting second points from the second point cloud;
   determining a displacement between respective corresponding selected first points and selected second points; and
   estimating the ego motion of the vehicle on the basis of the displacement,
   wherein:
      the selection of the first points and the selection of the second points is carried out in dependence on a shape of the respective clusters; and
      the selection of the first points and the selection of the second points are additionally carried out in dependence on a location of the respective clusters.

9. The computing device of claim 7, wherein the selection does not take place for first points and for second points which are assigned to a cluster having an elongate shape.

10. The computer device of claim 7, wherein corresponding clusters of the first points and clusters of the second points are determined; and
   the selection does not take place for first points and for second points if a size and/or shape of the corresponding clusters differs.

* * * * *